April 10, 1928.
J. G. AUSTIN
AUTOMOBILE TURNTABLE
Filed July 15, 1927
1,665,997
2 Sheets-Sheet 1
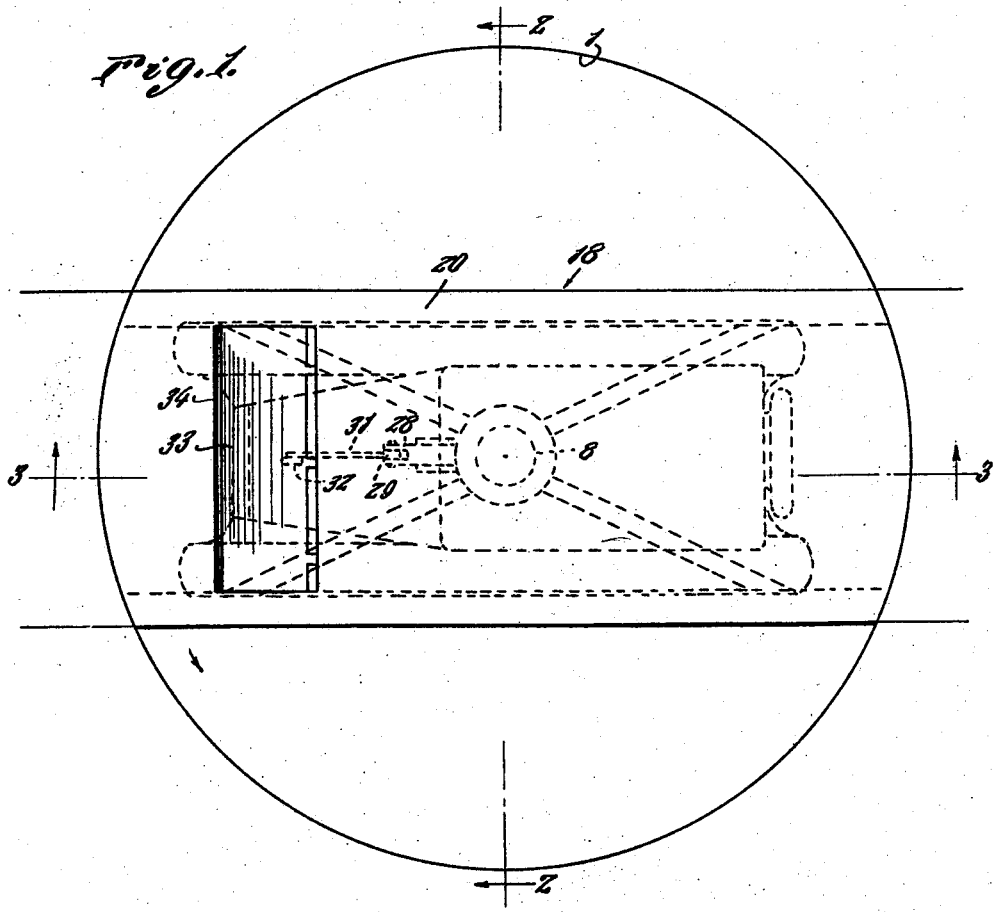
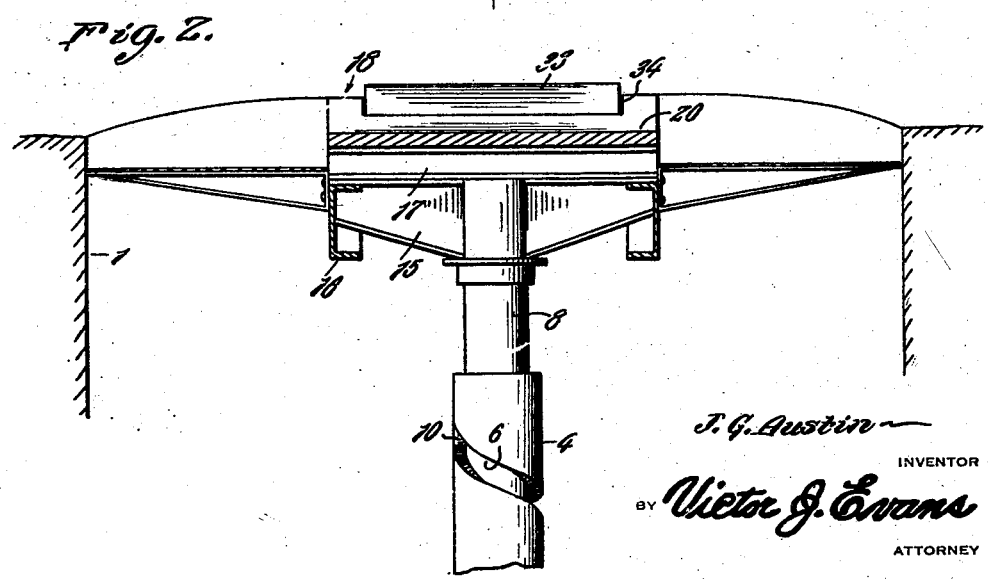
J. G. Austin
INVENTOR
BY Victor J. Evans
ATTORNEY April 10, 1928.

J. G. AUSTIN 1,665,997

AUTOMOBILE TURNTABLE

Filed July 15, 1927

J. G. Austin
INVENTOR

BY Victor J. Evans
ATTORNEY

Patented Apr. 10, 1928.

1,665,997

UNITED STATES PATENT OFFICE.

JAMES G. AUSTIN, OF PRICE, UTAH.

AUTOMOBILE TURNTABLE.

Application filed July 15, 1927. Serial No. 206,075.

The object of this invention is the provision of an automatic turn table for automobiles and like vehicles.

A further object is the provision of a turn table for this purpose designed especially for use in garages or other places in which it is desirable to turn a vehicle in a space but little greater than the length of the vehicle, and in which the weight of the vehicle acts to automatically turn the turn table, so as to reverse the position of the vehicle when arranged thereon.

A still further object is the provision of a turntable which will be automatically moved to one position by the weight of a vehicle thereon, and which will be likewise automatically returned, by spring means, to its initial position.

I accomplish the above recited objects and others which will appear as the nature of the invention is better understood by a construction, combination and operative association of parts, one satisfactory embodiment of which is disclosed by the accompanying drawings.

In the drawings:

Figure 1 is a plan view of the improvement, the automobile arranged on the turn table being indicated by the dotted lines.

Figure 2 is a sectional view approximately on the line 2—2 of Figure 1.

Figure 3:
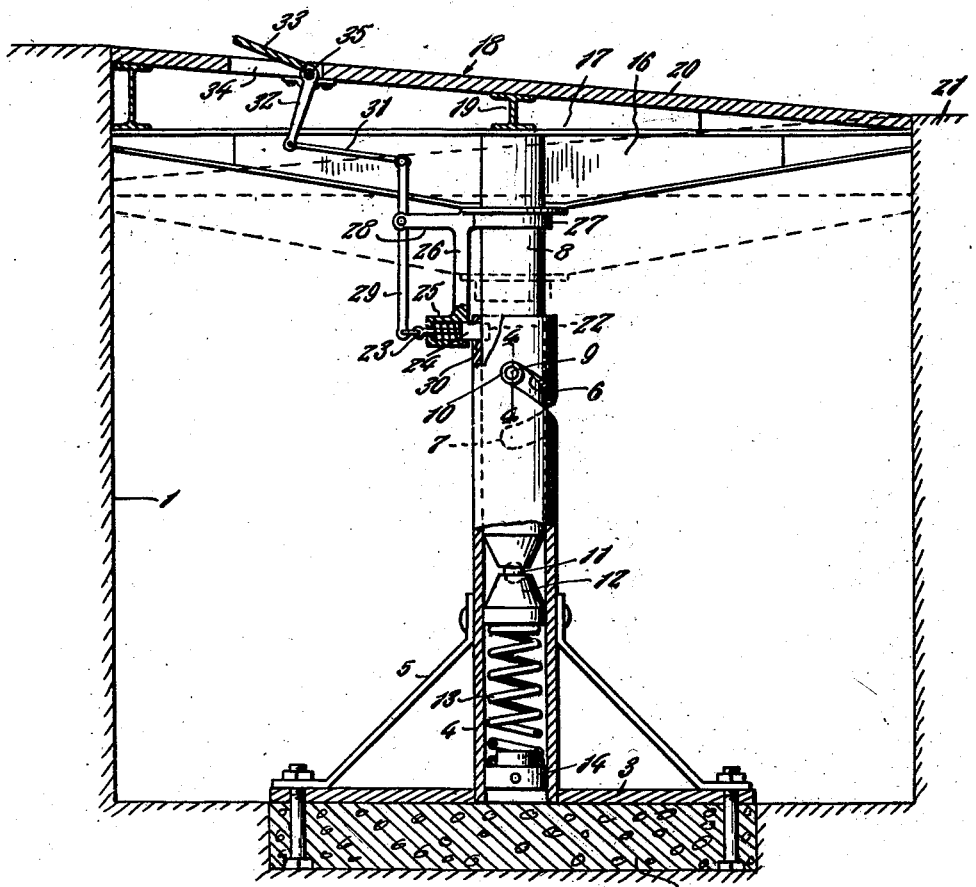
Figure 3 is a sectional view approximately on the line 3—3 of Figure 1.
Figure 4:
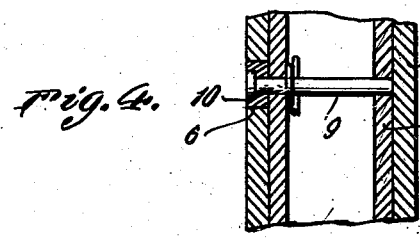
Figure 4 is a sectional view approximately on the line 4—4 of Figure 3.

In a garage or other places where the turn table is to be erected I dig a circular pit 1. In the bottom of the pit I embed a concrete foundation 2 on which is fixed the base plate 3 of the improvement. From the base plate 3 there centrally arises a tubular standard 4. Suitable brace means 5 are arranged between the standard and the base plate 3.

The standard 4, adjacent to its upper end, is formed with an elliptical slot or opening 6 whose end walls are rounded, as at 7, and the said end walls being disposed in a line with the center of two of the diametrically opposite sides of the standard 4.

Arranged freely in the hollow standard 4 there is the cross sectionally rounded shaft element or member 8 of the improvement. The shaft 8 has an outstanding stud 9 surrounded by an anti-frictional band or ring 10 that contacts with the opposite walls provided by the elliptical slot 6. The bottom or inner end of the shaft 8 is preferably cone-shaped and is provided with a cup-shaped depression in which is received one portion of a sphere 11, the second portion of the sphere resting in a similar cup-shaped depression in the conical end of a cross sectionally rounded member 12. The member 12 is contacted by a comparatively heavy spring 13 arranged in the tubular standard 4, the inner end of the member 12 being provided with a lug that is surrounded by one of the end convolutions of the spring and the second convolution of the said spring surrounds a second lug formed on a member 14 that is fixedly secured in the standard at or directly above the base 3.

Fixedly secured to the top of the shaft 8 there is the central portion of a beam 15. On the ends of the beam 15 there are secured other beams 16 which, of course, are arranged rightangularly with respect to the beam 15. On these beams 15 and 16 there is secured the bottom plate 17 of the turn table 18. The plate 17 is also secured on the top of the shaft 8. Resting on the plate 17 and, of course, secured thereto as well as to the supporting beams for the turn-table there are transverse beams 19 which vary in height, so that the upper plate 20 of the turn table 16 is disposed at an angle and provides an inclined plane. One end of the pit 1 is disposed in a line with the lower end of the top member 20 of the turn table 18 and the other in a line with the elevated end of the said turn table. The slot 6 describes a half-circle, or more properly speaking, the turn table when depressed is permitted to revolve exactly one-half a circle, and in revolving the turn table will be moved in a downward vertical direction, so that its normally elevated end will be disposed in a line with the lower end of the floor 21 in which the pit 1 is dug. The table can only turn when a weight is arranged thereon, and such weight must be sufficient to compress the spring 13. When the weight of the vehicle is relieved from the turn table the spring 13 will expand and by virtue of such expansion will exert an upward pressure upon the member 12 and a like pressure upon the shaft 8, and this pressure will cause the roller to travel from the lower portion of the slot 6 into the upper portion thereof, thus returning the turn table to its initial positon.

To prevent the movement of the turn table before a vehicle is properly arranged thereon the shaft 8 has a notch 22 therein disposed opposite and designed to aline with an opening 23 in the tubular standard 4, when the anti-frictional roller or band 10 contacts with the upper end wall provided by the slot or notch 6. Movable through the opening and into the notch 22 there is a spring influenced dog 24. The dog is received in a socket or housing 25 preferably formed on the end of an arm 26 of a bracket, a ring portion 27 of which surrounds the shaft 8 and has an arm extension 28 to which is pivoted a lever 29 that in turn is pivoted or loosely connected to a rod 30 that has one end fixed to the dog 23 and its second end projecting through the socket or housing 25. A link 31 connects the upper end of the lever 29 with an angle finger 32 that depends from a platform 33 that is received through an opening 34 in the top member 20 of the turn table 18, and that is pivotally secured to the turn table, as indicated by the numeral 35. The platform is really in the nature of a trigger and the same is designed to be contacted by the wheels of a vehicle that is driven on the turn table. When the platform is depressed the dog 24 will be brought out of engagement with the shaft 8, permitting the shaft to turn and move downwardly in the hollow standard 4.

The improvement is of a simple construction, employing few parts, may be readily erected and is entirely automatic in its action. Obviously I do not wish to be restricted to the precise details of construction as herein set forth and, therefore, it is to be understood that the improvement is limited only to the scope of the appended claims.

Having described the invention, I claim:—

1. In a device for the purpose set forth, a pit, having one of its side walls at a greater elevation than the other, a hollow standard centrally fixed in the pit, a shaft having a portion freely received in the standard, said standard having an elliptical opening whose end walls are rounded and which are disposed in a line with the axial center of two of the opposite sides of the standard, an anti-frictional roller on the shaft received in the slot, spring means in the standard exerting a pressure against the inner end of the shaft, and a turn table fixed on the shaft having its top portion in the nature of an inclined plane, and having its ends normally arranged in a line flush with the mentioned side walls provided by the pit.

2. In a device for the purpose set forth, a pit, having one of its side walls at a greater elevation than the other, a hollow standard centrally fixed in the pit, a shaft having a portion freely received in the standard, said standard having an elliptical opening whose end walls are rounded and which are disposed in a line with the axial center of two of the opposite sides of the standard, an anti-frictional roller on the shaft received in the slot, spring means in the standard exerting a pressure against the inner end of the shaft, a turn table fixed on the shaft having its top portion in the nature of an inclined plane, and having its ends normally arranged in a line flush with the mentioned side walls provided by the pit, latching means normally holding the shaft from turning and depressible means on the turn table for releasing the latching means.

3. In a turn table for the purpose set forth, which includes a pit dug in the floor of a garage or the like and in which the floor sections of the garage at the opposite sides of the pit are elevated one above the other, said turn table including a tubular standard arising centrally from the bottom of the pit, brace means for the standard, said standard, adjacent to its outer end having an elliptical slot therethrough, whose end walls are rounded and are disposed in a line with the axial center of two of the diametrically opposite sides of the standard, a shaft having a portion received in the standard, an anti-frictional roller on the shaft received in the slot of the standard, a comparatively heavy expansible spring in the standard, a member resting on and influenced by the spring, an anti-frictional sphere seated in this member and seated in the inner end of the shaft, lateral and transverse beams on the top of the shaft, a plate comprising the lower member of the turn table fixed on the beams, a second and angularly disposed plate fixed on the lower plate and providing the outer member of the turn table and said outer member being normally disposed to have its ends in a line with the upper and lower walls of the floor of the garage.

4. In a turn table for the purpose set forth, which includes a pit dug in the floor of a garage or the like and in which the floor sections of the garage at the opposite sides of the pit are elevated one above the other, said turn-table including a tubular standard arising centrally from the bottom of the pit, brace means for the standard, said standard, adjacent to its outer end having an elliptical slot therethrough, whose end walls are rounded and are disposed in a line with the axial center of two of the diametrically opposite sides of the standard, a shaft having a portion received in the standard, an anti-frictional roller on the shaft received in the slot of the standard, a comparatively heavy expansible spring in the standard, a member resting on and influenced by the spring, an anti-frictional sphere seated in this member and seated in the inner end of the shaft, lateral and transverse beams on the top of the shaft, a plate comprising the lower member of the turn table fixed on the beams, a second and angularly disposed plate fixed on the lower plate and providing the outer member of the turn table and said outer member being normally disposed to have its ends in a line with the upper and lower walls of the floor of the garage, a spring influenced dog normally engaging the shaft to hold the same from vertical movement and from turning, a pivotally supported platform on the turn table, having a depending finger, a pivotally supported lever connected to the dog and a link connection between the lever and the finger.

In testimony whereof I affix my signature.

JAMES G. AUSTIN.